United States Patent [19]

Neubronner

[11] 4,181,558

[45] Jan. 1, 1980

[54] METHOD AND DEVICE FOR THE TAPE-SEALING OF PANELS OF PAPER, CARDBOARD, PLASTIC, OR WOOD, AND ADHESIVE TAPE THEREFOR

[76] Inventor: Rolf Neubronner, 6246 Glashütten, Zum Talblick 64, Fed. Rep. of Germany

[21] Appl. No.: 812,771

[22] Filed: Jul. 5, 1977

Related U.S. Application Data

[63] Continuation of Ser. No. 594,260, Jul. 9, 1975, abandoned.

[30] Foreign Application Priority Data

Jul. 9, 1974 [DE] Fed. Rep. of Germany ....... 2432895

[51] Int. Cl.[2] .............................................. B32B 31/00

[52] U.S. Cl. ..................................... 156/355; 93/1 F; 93/36 M; 126/285 R; 156/359; 156/363; 156/499; 156/506; 432/230; 432/253

[58] Field of Search ............... 156/157, 219, 272, 297, 156/304, 306, 320, 502, 504, 509, 506, 507, 545, 380, 521, 499, 353–355, 359, 363, 364; 93/1 F, 1 G, 36 R, 36 A, 36 M, 36.6, 38.9, 58 R, 58.3; 126/285 R; 432/230, 231, 233, 253; 219/354, 553

[56] References Cited

U.S. PATENT DOCUMENTS

| | | | |
|---|---|---|---|
| Re. 23,512 | 6/1952 | Von Hote | 156/320 |
| 2,538,520 | 1/1951 | Holt et al. | 156/320 |
| 2,613,007 | 10/1952 | Von Hote | 156/320 |
| 2,621,823 | 12/1952 | Perry | 156/320 |
| 3,346,433 | 10/1967 | Lopez | 156/355 |
| 3,455,768 | 7/1969 | Niemeyer | 156/521 |
| 3,654,038 | 4/1972 | Hottendorf | 156/521 |
| 3,832,258 | 8/1974 | Roberts | 156/521 |
| 3,904,466 | 9/1975 | Jones | 156/320 |

*Primary Examiner*—John E. Kittle

*Attorney, Agent, or Firm*—Schwartz, Jeffery, Schwaab, Mack, Blumenthal & Koch

[57] ABSTRACT

A method and device for applying heat-activatable adhesive tape to boxes and the like, using sealing tape with adhesive that can be activated through radiant heat or hot air prior to its application to the box surface, where, in contact with a cold surface, the adhesive is instantaneously cured. The device includes a suction-type conveying device for the adhesive tape, either a belt conveyor cooperating with an infra-red heater, or a suction drum with a hot air supply.

15 Claims, 6 Drawing Figures

METHOD AND DEVICE FOR THE TAPE-SEALING OF PANELS OF PAPER, CARDBOARD, PLASTIC, OR WOOD, AND ADHESIVE TAPE THEREFOR

CROSS REFERENCE TO RELATED APPLICATIONS

This application is a continuation application of my copending application, Ser. No. 594,260, filed July 9, 1975, now abandoned.

BACKGROUND OF THE INVENTION

1. Field of the Invention

The present invention relates to the box making art, and more particularly to methods and devices for the tape-sealing of box panels of paper, cardboard, plastic, wood, and the like, as well as to adhesive tapes that are suitable for this purpose.

2. Description of the Prior Art

The manufacture of box containers for commercial goods involves in general the cutting of a box blank of predetermined configuration from a continuous web of cardboard, corrugated board, pasteboard, and the like, in an automatic blank cutting operation, whereupon the blank is creased along its fold edges, and the flaps are bent into place and permanently connected together. These flap connections, which are made in the process of mechanized box production, are commonly referred to as "factory seals" or "manufacturer's seals".

The oldest version of commonly employed factory seals is the one using wire staples of round or flat wire. This design, however, necessitates an overlap between the flaps which are to be so connected, meaning that the boxes require larger blanks and additional folding operations. The overlapping box portions also make stacking of the finished boxes more difficult. A further problem of this design relates to the mechanical resistance of the stapled connections, especially in the case of lightweight cardboard boxes. Furthermore, the stapling operation is slow and therefore generally not very satisfactory, because it requires a stapler anvil, in order to hold the flaps together and to correctly close the staple. A still further shortcoming of this type of flap connection comes to the fore, when coated box materials are used, where the staples create breaks in the otherwise humidity-proof surface of the box, so that humidity may penetrate through these breaks along the staples, for example.

Similar shortcomings are characteristic of a second mode of box flap connection, where overlapping flaps are directly bonded against one another. This kind of connection has the additional disadvantage that the mechanical resistance of the connection is determined by the tear resistance of the inner and outer webs that constitute the connection. This tear resistance, i.e. the resistance of the material against separation into different layers, is frequently inadequate for the specified purpose.

It has further been suggested to employ adhesive tape, in order to produce factory seals on boxes of the above-mentioned type, such tapes being of the non-reinforced or bias-reinforced adhesive tape variety. This type of flap connection does not require the previously necessary overlap at the factory seal, thus simplifying the configuration of the box blank and the folding operation, as well as reducing the size of the blank. However, the known adhesive tapes of the humidity-activatable type have the disadvantage that they cannot be applied to coated surfaces. Consequently, it was impossible in the past to use such tapes for moisture-proof and water-proof plastic coated cardboard boxes. Until now, therefore, there has not been in existence a tape-sealing method which could be used economically for coated box containers.

In general, the method of tape-sealing factory seals on boxes has been hampered by the problem of correct adhesive activation, the latter requiring a precisely controlled moisturization of the tape. But, since the optical degree of moisturization differs from adhesive to adhesive, and in some cases is even influenced by the conditions and duration of storage of the adhesive tape, problems of downtime and spoilage are common. A still further problem encountered with regular adhesive tapes is that the latter, after moisturization and application to the box surface, require a certain time for the adhesive to set and cure, which means that an automatic folding machine requires a special pressing station through which the boxes have to travel until the tape is securely glued to the substrate. This requirement constitutes an upper limit for the production rates of mechanized box making machinery where such a tape-sealing method is used. Ancillary problems encountered with this method are the well-known tendency of water-activatable adhesive tapes to curl, as a result of fluctuations in the ambient temperature and/or humidity conditions, and problems of adhesion encountered when the box panels are not entirely clean, as when their flaps carry dust on the outer surfaces. Similar shortcomings apply to the use of adhesive tapes of the self-adherent type (e.g. so-called masking tapes) which, because of their curling tendency, are entirely unsuitable for mechanized application.

Much the same conditions apply to the closing operation on filled boxes, when the so-called "shipper's seal" is applied. In this operation, the abutting outer bottom flaps, or cover flaps, as the case may be, are connected together by means of wire staples, glue, adhesive tape, or masking tape, or the like. The problems encountered with the various sealing methods and materials are very similar to those described earlier in connection with the production of the "factory seal".

On the other hand, it has already been proposed to produce the shipper's seal with the help of special adhesive tape, using a heat-activatable adhesive. The proposed adhesive has an activating temperature between 50° C. and 70° C. The great disadvantage of this type of adhesive, however, is that it requires between 12 and 24 hours to cure. Such a long curing time, in turn, requires a correspondingly extended storage of the sealed boxes following closing, during which time the sealing tape must not be subjected to stress. This means considerable delays in terms of storing and shipping procedures, as well as changes in the production timing. Still another important shortcoming resides in the fact that the comparatively low activating temperature of the adhesive can lead to re-activation of the adhesive at temperatures as low as 50° C., on particularly hot summer days, for example, so that special precautions need to be taken in terms of storage and shipping conditions for this type of box.

Lastly, there is known a box sealing method using heat-activatable tape, where the tape is applied to its substrate by means of hot jaws or hot plates. The simultaneous application of pressure and heat through the hot plates produces a welding effect at the instant of application. A particular disadvantage of this taping method is that it can only be then performed satisfactorily, when a firm counter support is available, the operating rate of a machine being thus largely determined by the resistance of the substrate under the pressure of the hot plates. Modern box making machinery, however, operates at production rates at which there is not enough time available for this kind of adhesive tape to be applied securely and consistently to the boxes.

SUMMARY OF THE INVENTION

It is a primary objective of the present invention to propose a new method and an improved device for the tape-sealing of boxes and panels of paper, cardboard, plastic, wood, and the like, by means of heat-activatable adhesive tape, which method and device are suitable for mechanized production at high production rates, producing a durable resistant seal between the above materials in a simple, rapid operation.

The present invention proposes to attain the above objectives, by suggesting the use of a heat-activatable adhesive-coated tape of delayed curing action, the adhesive on the tape being activated by means of directly or indirectly applied heat, after which the tape is promptly applied to the box flaps under moderate pressure.

The proposed novel tape-sealing method completely eliminates all the disadvantages and shortcomings of the prior art box sealing methods mentioned earlier. The proposed method, using preferably a heat-activatable adhesive tape whose adhesive layer has an activating temperature of 100° C. and above, also produces a very even activation of the adhesive layer, as the necessary heat is applied either indirectly, or directly, through radiation. The result is a very uniform adhesive bond between the tape and the substrate which is very durable and unaffected by extraneous influences. The high activating temperatures of the proposed adhesive not only offer a practically absolute safety against ambient conditions during storage, they also virtually preclude any failure of the adhesive bond through reactivation of the tape, once it has been applied to the box. The proposed sealing tape with its heat-activatable adhesive layer is also suitable for application onto coated cardboard surfaces for which all previously known tape-sealing methods have proved to be entirely unsuitable. The very high adherence obtainable with the novel tape further makes it possible to utilize plastic coated material for the tape itself. Consequently, the proposed novel tape-sealing method offers the possibility, for the first time, to produce absolutely humidity-proof box containers, using coated cardboard boxes which are tape-sealed in accordance with the method of this invention.

The delayed curing action of the heat-activatable adhesive layer, in conjunction with the need for higher temperatures for the activation of the adhesive, produce operating conditions, under which the hot adhesive tape, contacting a cold substrate, produces an almost shock-like cooling effect on the adhesive upon contact with the cold box panel surface, resulting in a virtually instantaneous adherence of the tape to the panel surface. The very burdensome curing times previously required in connection with water-activatable adhesive tape or with thermo-adhesive tape are thereby entirely eliminated, as well as the special problems which are encountered when heat-activatable materials are applied with the use of hot plates and/or hot jaws. It follows from this that the immediate adherence of the tape to its substrate and the earlier-mentioned characteristic of the proposed adhesive to undergo delayed curing, in connection with the comparative simplicity of the operating steps involved, lend themselves for high production rates under this method. It is thus no longer necessary to consider the adherence of the tape to its substrate as a limiting factor in the selection of the operating speed of the machine. It was further found that the use of the novel heat-activatable adhesive tape brings with it a higher degree of uniformity in terms of adhesive activation, because of the higher temperatures employed and because of the possibility of applying the heat to the tape before it reaches the substrate. Lastly, because the novel tape is virtually unaffected by changes in ambient conditions during storage and use, it does not exhibit the curling tendency which is characteristic of prior art tapes.

Although the proposed novel method offers a maximum of advantages, when applied in conjunction with the production of boxes of plastic coated cardboard, when producing factory seals on such blanks, it can, of course, also be used to great advantage for different purposes, such as the application of the shipper's seal to this type of plastic coated cardboard box, as well as for the sealing of other types of boxes and panels along abutting seams, including panels of such materials as corrugated board, or wood (veneer and plywood) used in similar applications. The adhesive may be activated by means of heated rollers or heated plates, or indirectly, by means of radiant heat.

A preferred mode of heat-activating the adhesive tape involves the radiation of heat onto the tape by means of an infrared heater. Another convenient mode of heating the adhesive tape involves the use of a stream of hot air, whereby, under certain circumstances, the tape itself may simultaneously also be heated from its back side through heat convection, as when the tape is guided over a hot conveyor belt or over a hot conveying drum, or the like, while it moves through an activating zone in a box sealing machine. The simultaneous heating of the body of the tape has for its effect that more time may elapse between the activation of the adhesive and the application of the tape to its substrate, thus introducing a certain safety factor, without changing the fact that the shock-like cooling of the adhesive upon contact with the intended substrate virtually immediately cures the adhesive.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED EMBODIMENTS

Figure 1:
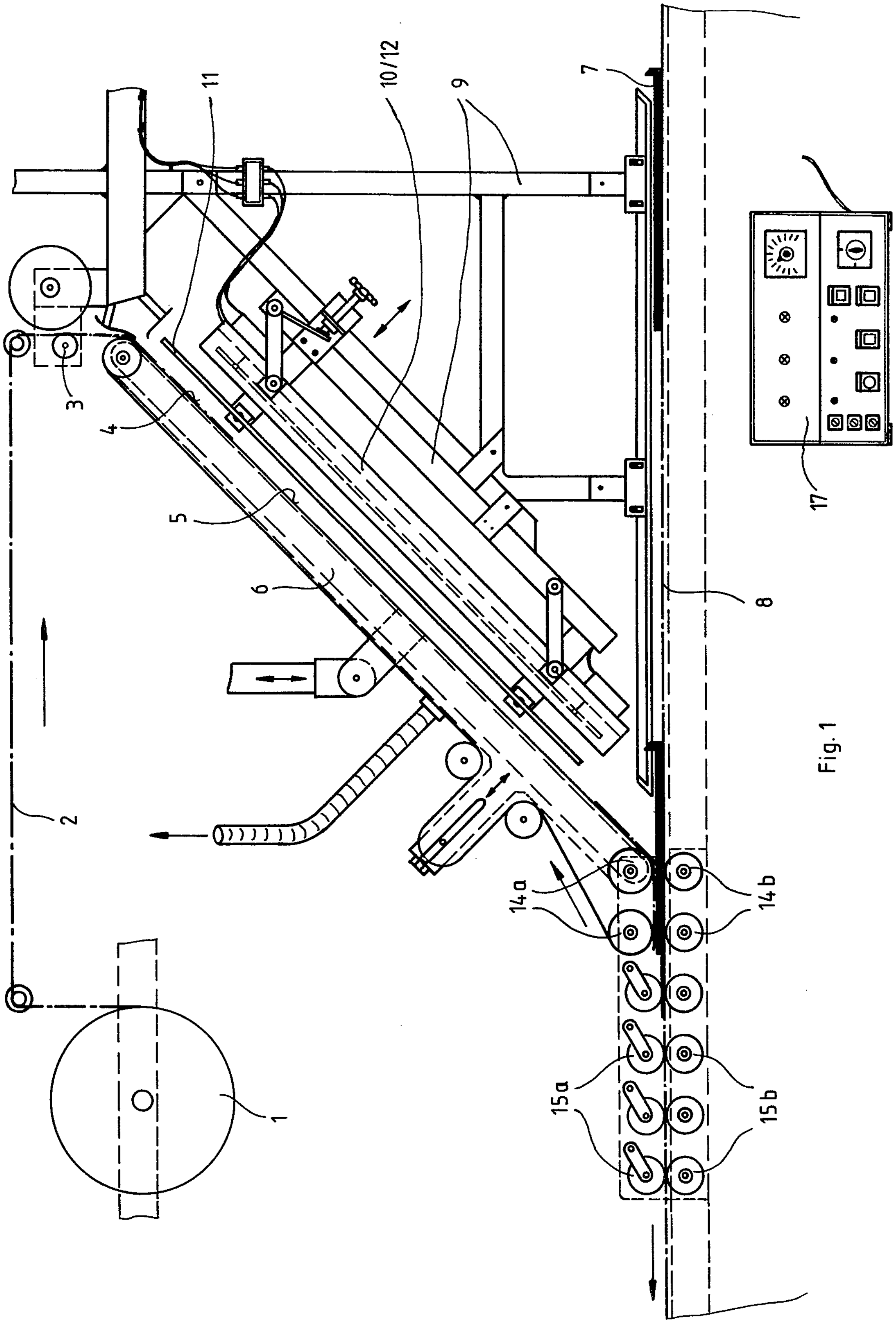
FIG. 1 shows, in a somewhat schematic representation, a device for the application of heat-activatable sealing tape to a substrate, in accordance with the proposed method of the invention, using an infrared heater.

Referring to FIG. 1 of the drawings, there is illustrated a device for the tape-sealing of box containers of corrugated board, to which the so-called "factory seal" is being applied. The device consists essentially of a supply roll 1 from which a continuous length of sealing tape 2 is paid out over suitable guide rollers, to a cutting device 3, where the tape 2 is cut at certain intervals and stopped, so that successive tape lengths 4 are fed at regular intervals to a tape conveyor belt 5 slanting downwardly away from the cutting device 3. The endless perforated conveyor belt 5 runs over the perforated lower side of a vacuum box 6, thereby being capable of carrying a succession of tape lengths 4 on its lower side. As the tape lengths 4 move downwardly toward the lower end of the tape conveyor 5, corresponding box blanks 7 move horizontally toward the same point, being carried by a blank conveyor 8.

Facing the lower side of the tape conveyor belt 5, and mounted on a machine frame 9, is a heater 10. The latter is preferably an infrared heater. The heater 10 is surrounded by a reflector housing 12 which is open toward the lower side of the tape conveyor belt 5, where a retractable screen 11 is interposed between the heater opening and the conveyor belt 5.

Figure 3:
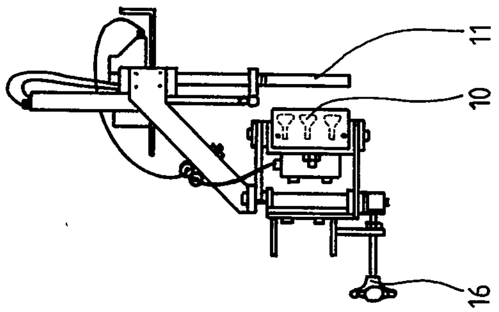
FIG. 3 shows the heater of FIG. 2 in an end view.
Figure 2:
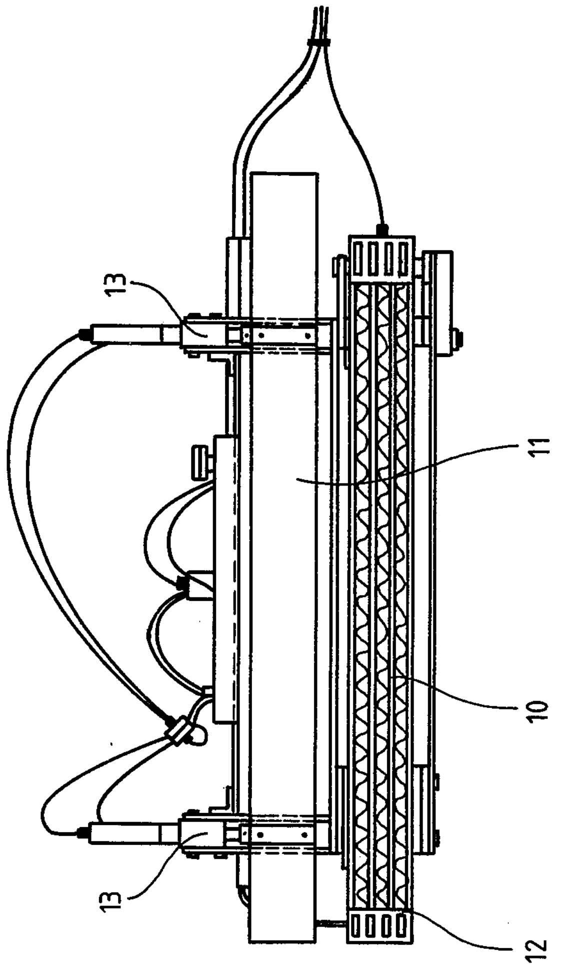
FIG. 2 shows the heater of the device of FIG. 1 in a plan view.

As can be seen in FIGS. 2 and 3, where the infrared heater 10 and the retractable screen 11 are illustrated in greater detail, the screen assembly 11 consists essentially of two double-acting pneumatic cylinders 13 and appropriate parallel guides carrying a flat, rectangular panel which, in the extended position of the cylinders 13, covers the opening of the infrared heater 10. The purpose of the screen 11 is to serve as a cover for the heater 10 against foreign objects and to protect the tape conveyor belt 5 against overheating during stillstand and between activation phases of the device. In the place of the pneumatic cylinders 13 may also be used hydraulic cylinders, or suitable solenoids and springs. The intensity of heat radiation is adjustable in two ways: On the one hand, it is possible to adjust the distance between the infrared heater 10 and the tape conveyor belt 5 by means of an adjustment spindle 16 (FIG. 3); on the other hand, one can adjust the heater output, using the heater output controls 17. The latter include manually adjustable controls as well as machine-speed-responsive automatic heater output controls. In a production machine, these controls may include special heater warm-up controls which, during an initial warm-up phase, switch the heater to maximum output, following which the output is automatically adjusted in accordance with the machine speed.

In the movement plane of the box blanks 7 on the blank conveyor 8 are further arranged two opposing roller pairs 14*a* and 14*b* and a succession of roller pairs 15*a* and 15*b*, and a succession of roller pairs 15*a* and 15*b*, respectively. The rollers 14*a* double as guide rollers for the tape conveyor belt 5, the first pair 14*a,b* defining the point where the activated adhesive tape length 4 and the box panel 5 are joined.

the device illustrated is designed for the automatic production of factory seals on box blanks. A regular succession of blanks 7 arrives horizontally between the roller pairs 14*a* and 14*b*, while a succession of tape lengths 4 arrives in synchronous motion from above, moving through an adhesive activating zone between the infrared heater 10 and the tape conveyor belt 5. As a tape length 4 enters the radiation zone of the heater 10, automatic controls actuate the cylinders 13 which retract the screen 11. The adhesive layer of the sealing tape 4, facing toward the heater 10, is not activated through direct heat radiation. No additional heating of the tape itself takes place. Before meeting with the box blank 7 between the roller pairs 14*a,b*, the activated tape length 4 leaves the activation zone, so that a shock-like cooling of the adhesive takes place, as it comes into contact with the cold surface of the box blank 7. To the extent that a portion of the tape conveyor belt 5 may have been heated through exposure to radiant heat from the heater 10, it is cooled again as it moves around the vacuum box 6. The controls for the screen 11 are set to automatically advance the latter between the heater 10 and the tape conveyor belt 5, should the supply of tape lengths 4 be interrupted for any reason.

Figure 4:
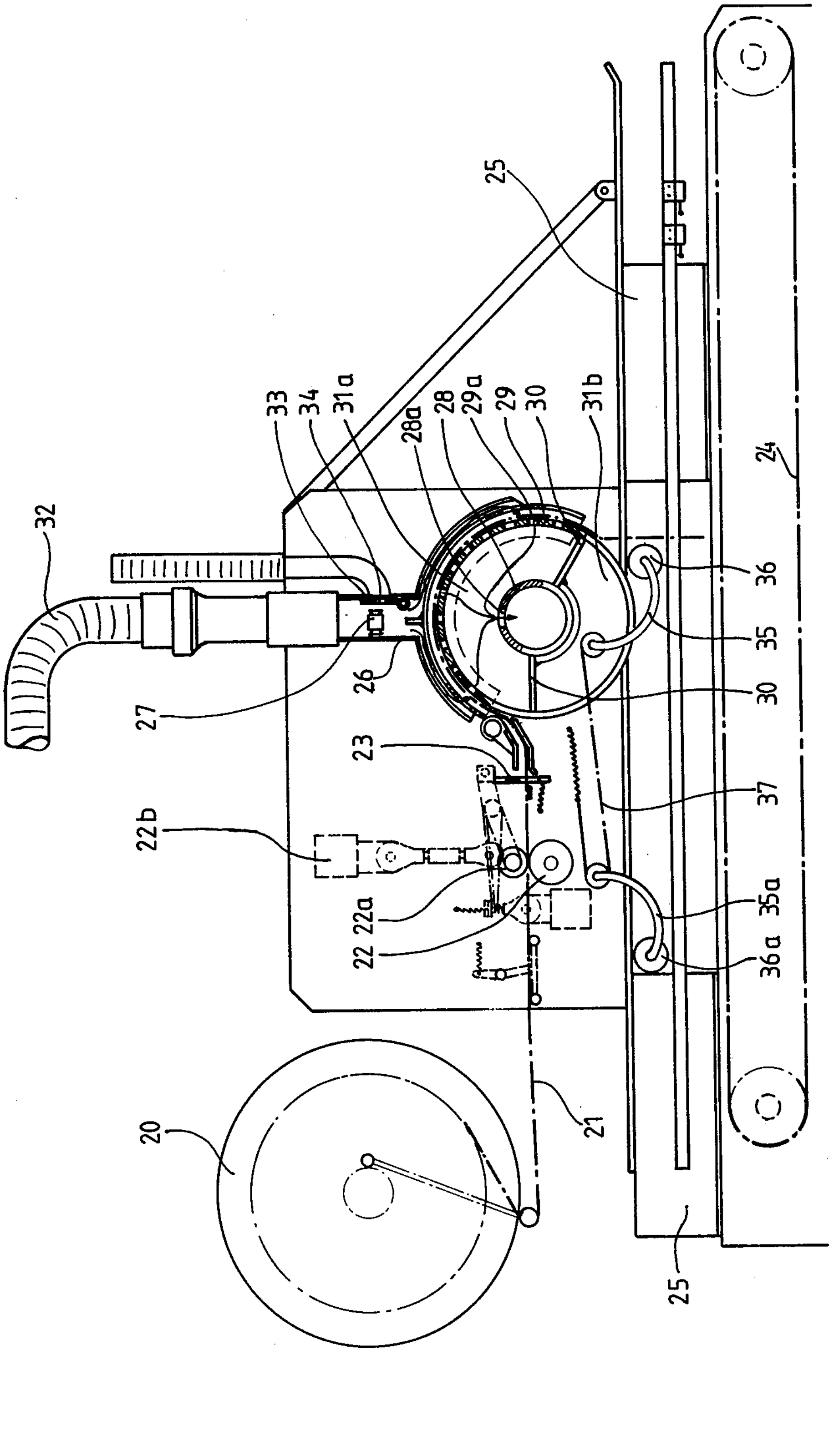
FIG. 4 shows, in a likewise schematic representation, a different device for the application of heat-activatable sealing tape to shipping boxes, in accordance with the method of the invention, using hot air as on activating medium.

Referring now to FIG. 4, there is illustrated a second embodiment of the invention, showing a tape-sealing device which employs a modified method of the invention in connection with a box closing machine, applying the so-called "shipper's seal". This device also uses a different mode of heat-activating the adhesive of the sealing tape, the previously described infrared heater being replaced by a hot air activating system.

The device of FIG. 4 consists essentially of a supply roll 20, holding a continuous length of adhesive tape 21. The latter is paid out from roll 20 through the action of a tape feed roller 22, connected to a suitable drive (not shown) and cooperating with a retractable counter-roller 22*a*, controlled by a solenoid 22*b*. From the feed roller 22, the tape 21 travels to a cutting device 23, from where the cut tape length advances to a drum 29 which will be described in more detail further below. A certain distance below the drum 29 is arranged a horizontal conveyor belt 24 which carries filled boxes 25 at regular intervals, the boxes passing just underneath the drum 29.

The activation of each tape length takes place as it travels around the periphery of the vacuum drum 29 which, as the word implies, has a perforated peripheral surface 29*a* against which the adhesive tape 21 is held under suction, as it travels around the drum 29. The latter is rotatably supported on a hollow stationary shaft 28. Radial bores 28*a* in the wall of the shaft 28 transmit suction from the shaft to the inside of the drum. The effect of the vacuum is angularly limited, however, by means of two vacuum baffles 30 extending from the shaft 28 to near-contact with the inside of the vacuum drum 29. The vacuum baffles 30 thus subdivide the interior of the drum 29 into a vacuum chamber 31*a*, to which corresponds a suction range on the periphery of the drum 29, and an atmospheric chamber 31*b*, to which corresponds a similar peripheral space of the drum 29 where no suction takes place. The cut tape length 21, arriving on the clockwise rotating drum periphery at about 9 o'clock, leaves that periphery at about 4 o'clock. In this angular range, the drum periphery is substantially enclosed within a housing 38 to which is connected a tabular air nozzle 26. Inside the latter is disposed a heater cartridge 27 by means of which air passing through the nozzle 26 into the housing 38 is heated. The blower (not shown) which supplies that air to the nozzle 26, via an air supply line 32, is preferably the same blower which also creates the suction for the vacuum chamber 31a of drum 29. While the latter may be operating on a continuous basis, the supply of heated air to the drum housing 38 is interruptable by means of a control clappet 33 arranged near the junction between the nozzle 26 and the housing 38. This control clappet is shown in enlarged detail in FIG. 5. An aperture 34 in the clappet is designed to supply a reduced amount of hot air to the drum surface, even when no tape, length 21 is present, so that the heated drum, in turn, will transfer heat to the body of the tape through heat convection. Where such heating of the tape itself is not desirable, the clappet aperture 34 is simply omitted, so that the supply of hot air to the drum surface is interrupted, as soon as the adhesive layer of the tape 21 has been activated and the tape is leaving the suction range on the drum circumference.

In FIG. 4 is further illustrated a known double-pendulum tape rolling device consisting of two tape rollers 36 and 36a mounted on pivotably supported pendulum arms 35 and 35a, respectively, which are operatively linked together by means of a linkage 37.

Figure 5:
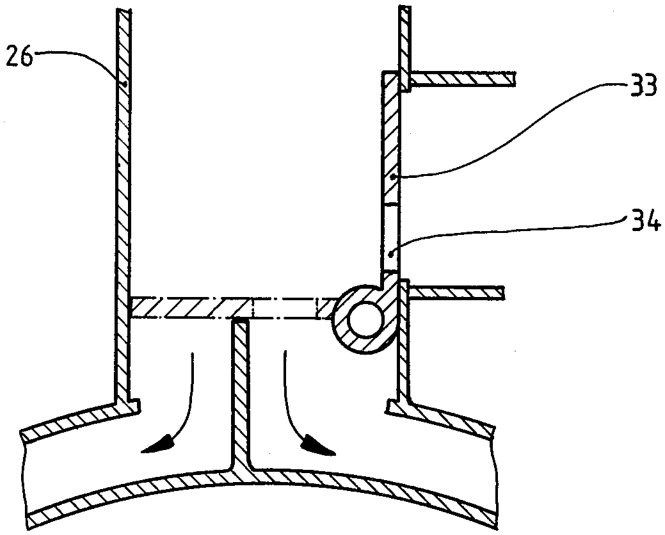
FIG. 5 shows an air control valve, as part of the device of FIG. 4.

The device of FIGS. 4 and 5, operates as follows: As a full box container 25 approaches the adhesive activating drum 29, it operates, at a certain distance from the latter, a control switch for the drive solenoid 22b, thereby causing the counter-roller 22a to engage the adhesive tape 21 against the drive roller 22 and to advance the tape against the drum 29. Simultaneously, the air control clappet 33 is switched from its bypass position (shown by dotted lines in FIG. 5) to its activating position (solid lines in FIG. 5), thereby opening the housing 38 of the drum to the hot air nozzle 26. The adhesive tape 21 reaches the drum 29 at its peripheral suction range so that the drum will now continue to advance the adhesive tape 21, and the drive solenoid 22b can be de-energized.

While the tape length 21 moves past the air nozzle 26, hot air is blown against the upwardly facing adhesive layer of the tape 21. This causes the adhesive material to be activated, while heat is also transferred from the drum surface to the tape itself, which snugly contacts the drum under the effect of the vacuum. This supply of supplemental heat into the body of the tape itself assures a sufficiently long maintenance of the activation of the adhesive layer following movement of the latter out of the activation zone. At about 4 o'clock on the periphery of the drum, where a vacuum baffle 30 separates the vacuum chamber 31a from the atmospheric chamber 31b, the adhesive strip 21 leaves the periphery of the drum 29, being guided vertically downwardly by means of a guide bracket.

Following payout of the required length of the adhesive tape 21 past the cutting device 23, through a corresponding angular motion of the vacuum drum 29, the cutting device 23 is activated through an appropriate switch in the path of the box 25. Due to the prior de-energization of the drive solenoid 22b, the leading edge of the uncut tape stops at the cutting device 23, while the cut tape length is fed around the vacuum drum 29, through the adhesive activating zone under the housing 38.

The leading edge of the adhesive tape 21, leaving the surface of the drum 29 at about 4 o'clock, moves downwardly in front of the tape roller 36, just before the front face of the box 25 reaches the downwardly extended roller. The movement of the box against the tape and the tape roller 36 causes the latter to execute a clockwise pivoting motion around the upper leading edge of the box 25, as the latter advances under the drum 29. This pivoting motion of the roller 36 on its pendulum arm 35 produces a similar counterclockwise pivoting motion of the roller 36a and pendulum 35a, due to the connecting linkage 37, so that the two pendulum arms wind up extending toward each other, allowing the advancing box 25 to pass under the second tape roller 36a, as the first tape roller 36 applies pressure against the sealing tape on the box 25. The passage of the trailing edge of the box past the tape roller 36 frees the latter, at which point the tape roller 36a takes over the application of the tape against the box. Thus, as the trailing edge of the box moves past the roller 36a, the latter follows the box in a clockwise descending motion, thereby pressing the trailing portion of the adhesive tape against the back face of the box 25.

As soon as the activated adhesive tape 21 leaves the housing 38, the air controlled clappet 33 is returned to its bypass position (FIG. 5), thereby reducing the amount of air passing through the drum 29, through the now result of the uncovered perforations, to a value which is sufficient to maintain the desired drum temperature.

The device illustrated and described hereinabove represents an embodiment of the inveniton which is designed to seal filled boxes on their upper closure seam, following prior sealing of the bottom seam. It should be understood, however, that both a bottom seal and a top seal could be applied in a modified device of the invention, a similar, inverted and perhaps slightly longitudinally offset second tape activating and applying unit being in this case arranged below the horizontal box conveyor.

Figure 6:
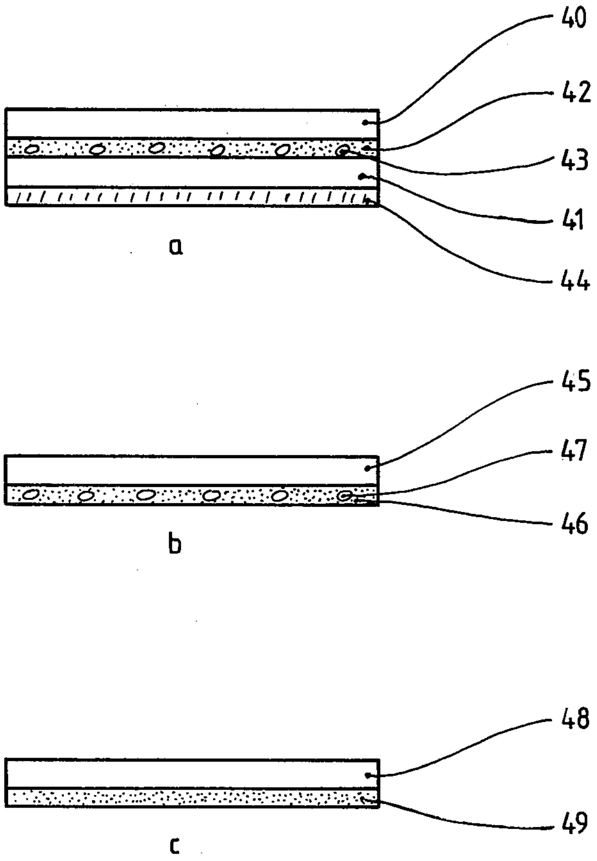
FIGS. 6a–6c show schematic cross sections of three different sealing tapes, in accordance with the present invention.

In FIGS. 6a, 6b, and 6c, are schematically illustrated cross sections of three different sealing tapes with heat-activatable adhesive layers, composed in accordance with the present invention. The three tape configurations have the following characteristics:

The tape of FIG. 6a consists of two separate carrier layers 40 and 41 of paper, film, or some other suitable material, the two layers holding between them an intermediate layer with reinforcing fibers 42, the layers being glued together in a conventional manner. This multi-layer carrier tape carries on one of its outer faces a heat-activatable adhesive layer 44, based on a thermoplastic or thermo-setting polymerisate, polycondensate, or polyadduct, or on an appropriately transformed natural plastic material.

The tape version of FIG. 6b features a single-layer carrier tape 45 of any suitable material, to which a heat-activatable adhesive layer 46 is applied, reinforcing fibers 47 being embedded in the adhesive layer. The possibility of incorporating the reinforcing fibers directly in the heat-activatable adhesive layer has the additional advantage of assuring that the reinforcing fibers become intimately bonded to the substrate itself, thereby reinforcing the box flaps at the abutting joint, rather than reinforcing only the sealing tape, which then only indirectly represents a reinforcement of the box, through the intermediate of a carrier layer, e.g. layer 41 in FIG. 6a.

The third tape version, shown in FIG. 6c, features a non-reinforced sealing tape consisting of a carrier web 48 of any suitable material and of a heat-activatable adhesive layer 49.

It should be understood, of course, that the foregoing disclosure describes only preferred embodiments of the invention and that it is intended to cover all changes and modifications of these examples of the invention which fall within the scope of the appended claims.

I claim the following:

1. A device for tape-sealing objects such as boxes, box blanks, or webs, made of paper, cardboard, plastic, wood, and the like, with a heat-activatable adhesive tape the device comprising in combination:

an adhesive activating station, including a heatable activating zone and a heat source capable of heating the activating zone to a temperature sufficient to activate the adhesive tape;

a joining station at which moving strips of adhesive tape of predetermined length meet moving objects of the above-mentioned kind serve as a substrate for said tape strips, when joined; the joining station being spaced a distance from said activating zone;

means for paying out a succession of said adhesive tape strips from an adhesive tape supply;

means associated with said tape payout means for conveying a succession of said tape strips through said activating station to said joining station in response to the conveying of said succession of objects to the joining station;

means for synchronously conveying a succession of said objects to the joining station;

means for applying a heat-activated adhesive tape strip to each of said objects in the joining station, thereby cooling and curing the adhesive upon contact;

wherein said adhesive tape payout means includes a supply roll, an interruptable tape payout drive and tape cutting means; wherein the tape strip conveying means includes a tape strip carrying member moving toward the joining station and subjected to suction, so as to be capable of holding the tape strip against the carrying member with their adhesive layer facing away from the carrying member; wherein the heat source faces the adhesive layer of the tape strips on the moving carrying member in said activating zone, so as to directly transmit heat to the adhesive layer across a gap between the tape strips and the heat source; wherein the heat source is an infrared heater which radiates heat against the adhesive layer of the tape strips on the carrying member; and wherein the adhesive activating station further includes means for selectively interrupting the heat transmitting action of said heater, through the interposition of a screen between the heater and the adhesive activating zone.

2. A tape-sealing device as defined in claim 1, wherein said interrupting means includes, in addition to said screen, means for advancing and retracting the screen in response to the absence or presence, respectively, of a tape strip in the adhesive activating zone.

3. A tape-sealing device as defined in claim 1, wherein the tape strip conveying means is a suction-type belt conveyor, including: an inclined elongated suction box with suction means; belt rollers on the upper and lower ends of the suction box, a lower belt roller being located in the immediate vicinity of the joining station; a perforated belt face on the suction box oriented downwardly and toward the rear, in the sense of movement of said objects; and an endless conveyor belt running obliquely downwardly along said face toward said joining station;

the object conveying means is a substantially horizontal belt conveyor moving said objects just underneath said lower belt roller of the tape strip conveyor; and the joining station includes a counter-roller cooperating from underneath the objects with said lower belt roller of the tape strip conveyor, thereby pressing the arriving heat-activated tape strips against the arriving objects.

4. A tape-sealing device as defined in claim 3, further comprising a pressing station including additional vertically cooperating roller pairs arranged behind said lower belt roller and cooperating counter-roller of the joining station.

5. A tape-sealing device as defined in claim 4, wherein the hot air blower and the vacuum source to which the tape carrying drum is connected are combined in the form of a suction-pressure pump.

6. A tape-sealing device as defined in claim 1, whrein the tape strip carrying member is an endless conveyor belt, forming part of a suction-type belt conveyor whose suction box has a flat belt face, the infrared heater being arranged parallel to said belt face and spaced therefrom so as to accommodate said screen therebetween.

7. A device for tape-sealing objects such as boxes, box blanks, or webs, made of paper, cardboard, plastic, wood, and the like, with a heat-activatable adhesive tape, the device comprising in combination:

an adhesive activating station, including a heatable activating zone and a heat source capable of heating the activating zone to a temperature sufficient to activate the adhesive tape;

a joining station at which moving strips of adhesive tape of predetermined length meet moving objects of the above-mentioned kind which serve as a substrate for said tape strips, when joined; the joining station being spaced a distance from said activating zone;

means for paying out a succession of said adhesive tape strips from an adhesive tape supply;

means associated with said tape payout means for conveying said tape strips through said activating station to said joining station;

means for synchronously conveying a succession of said objects to the joining station; and means for applying a heat-activated adhesive tape strip to each of said objects in the joining station, thereby cooling and curing the adhesive upon contact;

wherein said adhesive tape payout means includes a supply roll, an interruptable tape payout drive and tape cutting means; wherein the tape strip conveying means includes a tape strip carrying member moving toward the joining station and subjected to suction, so as to be capable of holding the tape strip against the carrying member with their adhesive layer facing away from the carrying member; wherein the heat sources faces the adhesive layer of the tape strips on the moving carrying member in said activating zone, so as to directly transmit heat to the adhesive layer across a gap between the tape strips and the heat source;

wherein the heat source is a hot air blower projecting hot air against the adhesive layer of the tape strips on the carrying member;

wherein the adhesive activating station further includes means for controlling the hot air flow;

wherein the tape strip carrying member is a peripherally perforated drum connected to a vacuum source;

wherein the hot air blower includes an air nozzle oriented for air discharge against the periphery of said drum; wherein the hot air flow controlling means includes an air clappet movable between an open position and a closed position in which the hot air flow to the drum periphery is at least partially interrupted; and wherein the air clappet of the hot air flow controlling means has a small aperture which, in the closed position of the clappet, admits a reduced flow of hot air against the drum periphery, thereby heating the latter for convective heat transfer to the back of tape strips which are conveyed by the drum.

8. A tape-sealing device as defined in claim 7, wherein the tape strip conveying means is a suction-type belt conveyor, including: an inclined elongated suction box with suction means, belt rollers on the upper and lower ends of the suction box, a lower belt roller being located in the immediate vicinity of the joining station; a perforated belt face on the suction box oriented downwardly and toward the rear, in the sense of movement of said objects; and an endless conveyor belt running obliquely downwardly along said face toward said joining station;

the object conveying means is a substantially horizontal belt conveyor moving said objects just underneath said lower belt roller of the tape strip conveyor; and the joining station includes a counter-roller cooperating from underneath the objects with said lower belt roller of the tape strip conveyor, thereby pressing the arriving objects.

9. A tape-sealing device as defined in claim 8, further comprising a pressing station including additional vertically operating roller pairs arranged behind said lower belt roller and cooperating counter-roller of the joining station.

10. A derice for tape-sealing objects such as boxes, box blanks, or webs made of paper, cardboard, plastic, wood and the like, with a heat-activatable adhesive tape; said device comprising in combination:

means for synchronously conveying a succession of objects to be tape-sealed to a joining station at which moving strips of adhesive tape meet said objects;

means for paying out a succession of adhesive tape strips from an adhesive tape supply; said tape payout means including a supply roll, an interruptable tape payout drive and tape cutting means;

means associated with said tape payout means for conveying a succession of said tape strips through an activating station to said joining station in response to the conveying of said objects to the joining station; said activating station including a heatable activating zone spaced a distance from said joining station; said tape strip conveying means comprising a perforated tape carrying member moving toward the joining station and connected to a suction source so as to be capable of holding a tape strip against the carrying member with its adhesive layer facing away from the carrying member;

means for applying a heat-activated adhesive tape strip to each of said objects in the adjoining station, thereby cooling and curing the adhesive upon contact with said objects;

said activating station comprising a heat source capable of heating the activating zone to a temperature sufficient to activate said adhesive tape; said heat source comprising a hot air blower facing the adhesive layer of the tape strips on the moving carrying member in said activating zone and projecting hot air against the adhesive layer of the tape strips on the carrying member so as to directly transmit heat to the adhesive layer across a gap between the tape strips and the blower; and said adhesive activating station further comprising means for controlling the hot air flow including an air clappet movable between an open position and a closed position in which the hot air flow through the carrying member is at least partially interrupted and means for opening and closing said clappet successively in response to conveying of said succession of tape strips.

11. A tape-sealing device as defined in claim 10, wherein the tape strip carrying member is a peripherally perforated drum connected to a vacuum source, and the hot air blower includes an air nozzle oriented for discharge against the periphery of said drum.

12. A tape-sealing device as defined in claim 10, wherein the tape strip conveying means is a suction-type belt conveyor, including: an inclined elongated suction box with suction means; belt rollers on the upper and lower ends of the suction box, a lower belt roller being located in the immediate vicinity of the joining station; a perforated belt face on the suction box oriented downwardly and toward the rear, in the sense of movement of said objects; and an endless conveyor belt running obliquely downwardly along said face toward said joining station;

the object conveying means is a substantially horizontal belt conveyor moving said objects just underneath said lower belt roller of the tape strip conveyor; and the joining station includes a counter-roller cooperating from underneath the objects with said lower belt roller of the tape strip conveyor, thereby pressing the arriving heat-activated tape strips against the arriving objects.

13. A tape-sealing device as defined in claim 12, further comprising a pressing station including additional vertically cooperating roller pairs arranged behind said lower belt roller and cooperating counter-roller of the joining station.

14. A tape-sealing device as defined in claim 11, wherein the perforated drum includes a hollow axle open to the interior of the drum, and the vacuum source is connected to the drum through said hollow axle.

15. A tape-sealing device as defined in claim 11, wherein the perforated drum includes means for dividing its interior space into a first section and a separate second section, said sections remaining angularly stationary as the drum rotates, said first section being adjacent said heat activating station and said second section being adjacent said joining station, and means for connecting only said first section to said vacuum source.

* * * * *